P. W. MANN.
COMBINATION AUTOTRUCK AND WAGON DUMP.
APPLICATION FILED MAR. 15, 1920.
1,390,368.
Patented Sept. 13, 1921.
3 SHEETS—SHEET 3.
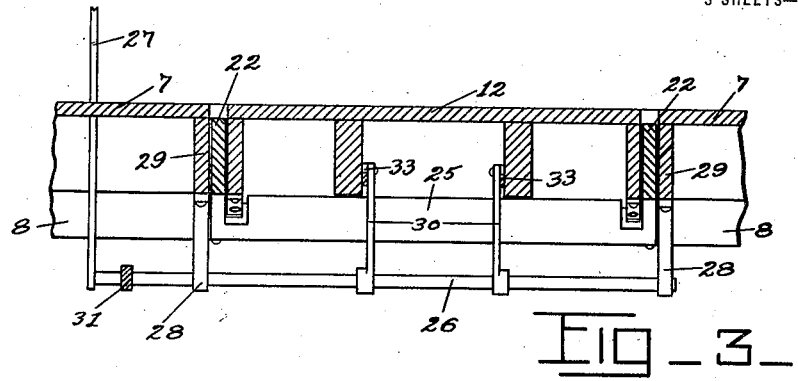
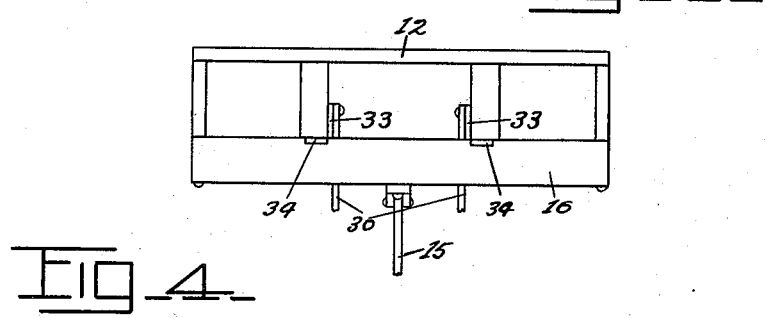
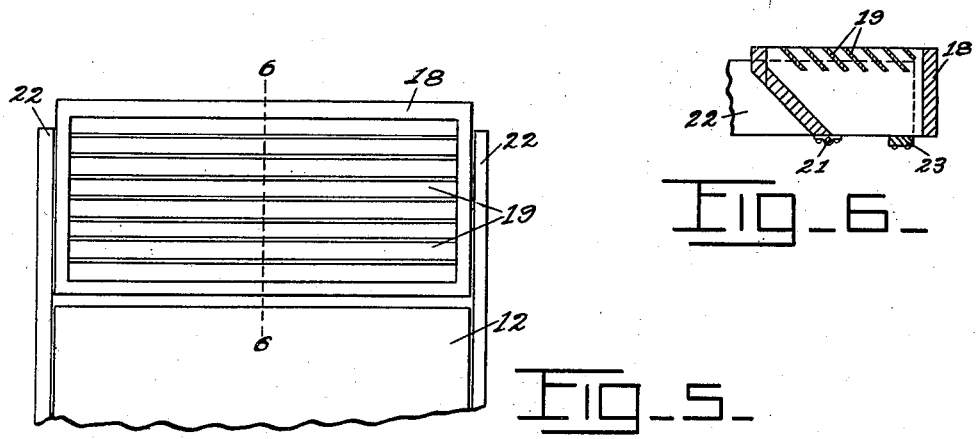
INVENTOR.
PEARLY W MANN
BY
*A. E. Carlsen.*
ATTORNEY

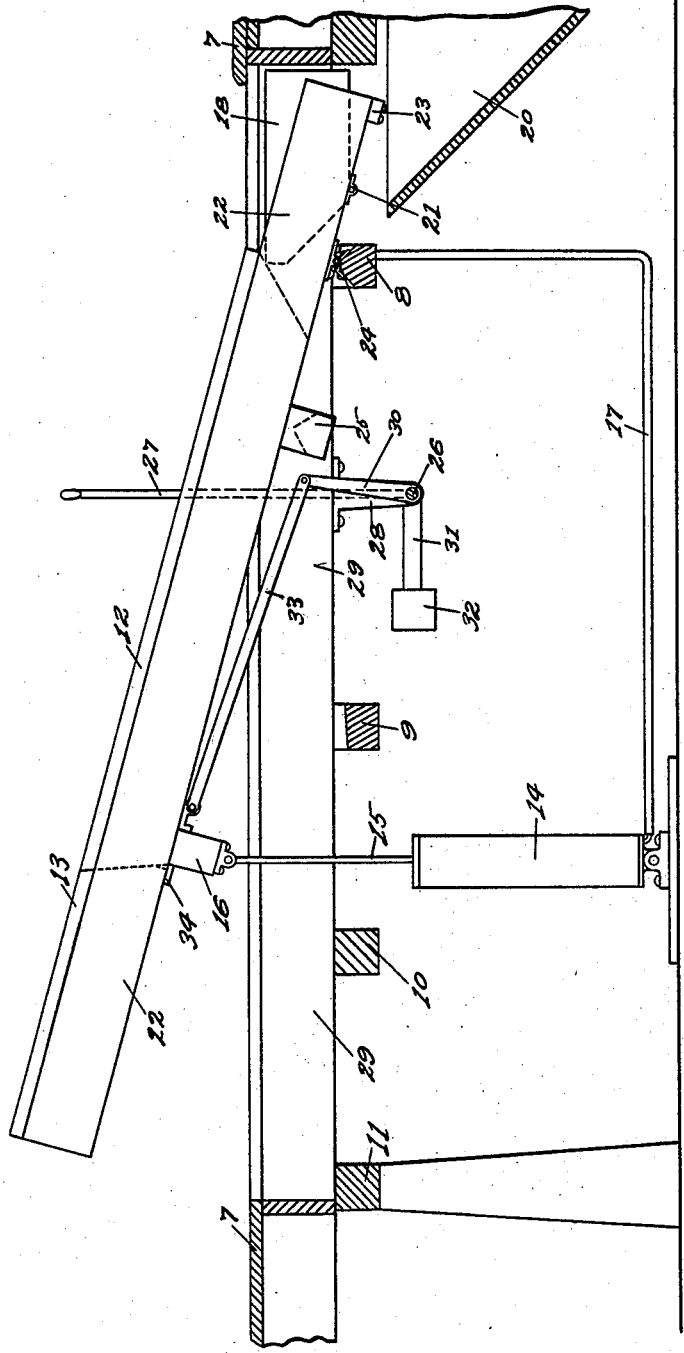

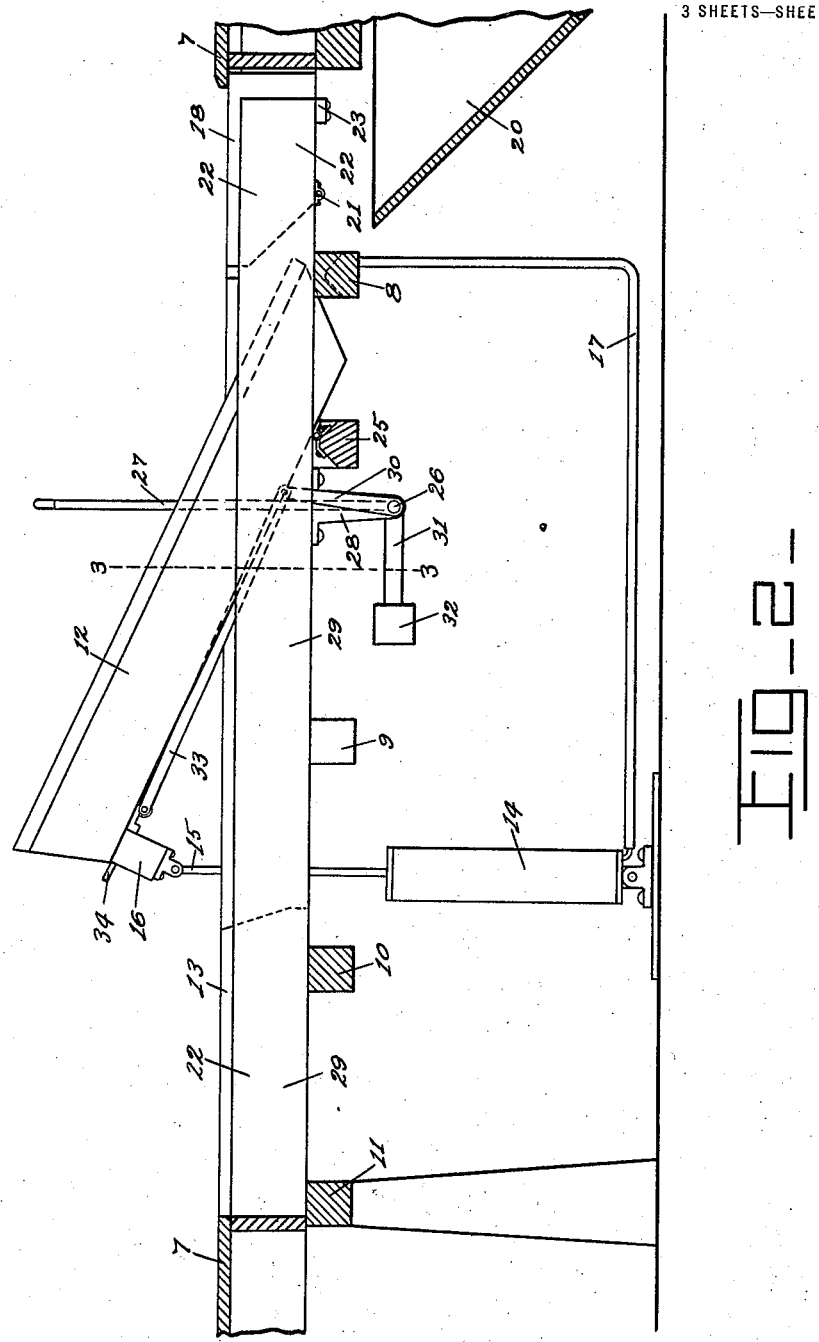

UNITED STATES PATENT OFFICE.

PEARLY W. MANN, OF MINNEAPOLIS, MINNESOTA.

COMBINATION AUTOTRUCK AND WAGON DUMP.

1,390,368.　　　　　Specification of Letters Patent.　Patented Sept. 13, 1921.

Application filed March 15, 1920. Serial No. 365,930.

*To all whom it may concern:*

Be it known that I, PEARLY W. MANN, a citizen of the United States, residing at Minneapolis, in the county of Hennepin and State of Minnesota, have invented certain new and useful Improvements in Combination Autotruck and Wagon Dumps, of which the following is a specification.

My invention relates to combination auto truck and wagon dumps, and the object is to provide a simple and efficient dumping device of an improved type, such dump being particularly of the class used in grain elevators. The invention is clearly shown in the accompanying drawings, in which:

Figure 1 is a sectional elevation of a floor in which is mounted my dumping device.

Fig. 2 is a view similar to Fig. 1 but with the dumping platforms in different positions.

Fig. 3 is a sectional view as seen on the line 3—3 in Fig. 2, but with both platforms in lowered positions.

Fig. 4 is an end view of the wagon platform or as seen substantially from the left in Fig. 2.

Fig. 5 is a detail view of the end of the truck dump and grate frame.

Fig. 6 is a sectional view on the line 6—6 in Fig. 5.

Referring to the drawings by reference numerals, 7 designates a floor having a rectangular aperture under which is fixed a number of transverse girders 8, 9, 10 and 11 which are adapted to support my dumping platforms.

The smaller or wagon dumping platform 12 constitutes a portion of the truck dumping platform 13 when the latter is used as such. A fluid pressure cylinder 14 having a piston 15 pivotally connected at its upper end to a beam 16 and connected to a supply pipe 17 is the preferred means used in this class of dumping platforms. When either platform is dumping the contents of a vehicle such contents fall through a frame 18, having angular grate bars 19, and down into the receiving hopper 20. The frame 18 is pivotally mounted at 21 to the side beams 22 of a long platform 13 and is further supported by a cross brace 23 fixed to the underside of said beams 22. The tilting point of the beams 22 is at suitable pivot bearings 24 on the beam 8, while the tilting pivot of the short dumping platform is on a beam 25 which is fixed at its ends to the beams 22.

A shaft 26, adapted to be actuated by a hand lever 27, is journaled in two bearings 28 which are fixed to the floor joists 29. Two vertical lever arms 30 are fixed to the shaft 26 as is also a horizontal arm 31 having a weight 32. The lever arms 30 are pivotally connected by link rods 33 to two catches 34 which are slidably secured in the beam 16.

When a wagon or other short vehicle is to be dumped it is driven up onto the platform 12 in the usual manner. The hand lever 27 is then moved to the right, lifting up the weight 32, which disengages the catches 34 and allows the platform 12 to be tilted when pressure is brought to bear in the cylinder 14. The device then assumes the position shown in Fig. 2. When the raised platform 12 is again lowered the catches 34 will because of the angle of the adjacent joint automatically snap back under the beams of the long platform.

When a truck or other long vehicle is to be dumped it is driven up onto the long platform. When the necessary piston pressure is applied the platform raises on the pivot 24, as shown in Fig. 1. In this case it will be noticed that the frame 18 is lowered, the object being to allow the rear end of low and long vehicles to be lowered without bumping against the floor or grate when so doing. When the long platform is again lowered all parts assume their proper positions.

It is understood that suitable modifications in design and structure may be made if such modifications are within the scope of the appended claims. Having now therefore fully shown and described my invention, what I claim to be new and desire to protect by Letters Patent is:

1. A vehicle dumping mechanism for relatively long and short vehicles, comprising a relatively long member tiltably mounted on a suitable bearing, a relatively short member forming a part of and tiltably mounted on said long member, means for locking said members in relatively rigid positions, means for tilting the shorter of said members singly or both members simultaneously when in said locked position, a horizontal frame having a grate therein pivotally secured to said long member rearward of said short member, and adapted to be lowered when said long member is tilted.

2. A vehicle dumping mechanism for relatively long and short vehicles, comprising a relatively long member tiltably mounted on a suitable bearing, a relatively short member forming a part of and tiltably mounted on said long member, means for tilting the shorter of said members singly or both members simultaneously, a horizontal frame having a grate therein positioned rearward of said short member, means for lowering said frame when said long member is being tilted.

In testimony whereof I affix my signature.

PEARLY W. MANN.